US008224271B2

(12) United States Patent
Persson et al.

(10) Patent No.: US 8,224,271 B2
(45) Date of Patent: Jul. 17, 2012

(54) ELECTRONIC DEVICE WITH AN IMPROVED ANTENNA ARRANGEMENT

(75) Inventors: Patrik Persson, Gråbo (SE); Martin Nils Johansson, Mölndal (SE); Anders Stjernman, Lindome (SE); Sven Anders Gösta Derneryd, Göteborg (SE); Jonas Fridén, Mölndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 112 days.

(21) Appl. No.: 12/810,059

(22) PCT Filed: Dec. 21, 2007

(86) PCT No.: PCT/EP2007/064437

§ 371 (c)(1),
(2), (4) Date: Jun. 22, 2010

(87) PCT Pub. No.: WO2009/080110

PCT Pub. Date: Jul. 2, 2009

(65) Prior Publication Data

US 2010/0297971 A1 Nov. 25, 2010

(51) Int. Cl.
*H04B 1/04* (2006.01)

(52) U.S. Cl. .................. 455/127.2; 455/129; 455/575.7; 455/562.1; 342/378; 342/382; 342/383

(58) Field of Classification Search ............... 455/127.2, 455/129, 575.7, 562.1; 342/378, 383, 382
See application file for complete search history.

(56) References Cited

U.S. PATENT DOCUMENTS

| | | | | |
|---|---|---|---|---|
| 4,737,793 | A | 4/1988 | Munson et al. | |
| 7,610,064 | B2 * | 10/2009 | Mohamadi | 455/561 |
| 2003/0146876 | A1 | 8/2003 | Greer et al. | |
| 2004/0127174 | A1 * | 7/2004 | Frank et al. | 455/101 |
| 2005/0266903 | A1 | 12/2005 | Masaki | |
| 2009/0005121 | A1 * | 1/2009 | Wong et al. | 455/562.1 |
| 2010/0277394 | A1 * | 11/2010 | Haustein et al. | 343/876 |

FOREIGN PATENT DOCUMENTS

| | | | |
|---|---|---|---|
| EP | 1 657 779 | A2 | 5/2006 |
| WO | WO 03/050917 | A1 | 6/2003 |
| WO | WO 2006/008452 | A1 | 1/2006 |
| WO | WO 2007/076895 | A1 | 7/2007 |

* cited by examiner

*Primary Examiner* — Sanh Phu
(74) *Attorney, Agent, or Firm* — Roger S. Burleigh

(57) ABSTRACT

An electronic device (200,300) comprising an antenna arrangement with first and second antenna groups with first (122, 142) and a second (124, 144) radiation elements. The first and second radiation elements in each group have first and second respective polarizations and gain, and said groups also comprise a beam forming network (126, 146) connected to the radiation elements of the group and to an output selector (150). The beam forming network (126, 146) of each antenna group uses the radiation elements (122, 124; 142, 144) in the group to create a radiation pattern (127, 147) with a polarization which is a composite of the first and second polarizations of the elements in the group, so that a first (127) and a second (147) radiation pattern of composite polarization is created. The output selector (150) selects or combines signals received by the two antenna groups as its output.

18 Claims, 4 Drawing Sheets

ELECTRONIC DEVICE WITH AN IMPROVED ANTENNA ARRANGEMENT

TECHNICAL FIELD

The present invention discloses an electronic device with an antenna arrangement with a first and a second antenna group, in each of which group there is a first and a second radiation element of a respective first and second polarization and gain.

BACKGROUND

With the growing market for, and use of, portable electronic devices such as, for example, so called “notebook” computers which can be used for connecting to wireless networks such as the Internet or home or office wireless networks, an increasing number of antennas are being arranged in these devices in order to be able to use different kinds of networks or communication principles. One example of such a communication principle of which mention can be made is the so called MIMO technology, Multiple Input Multiple Output technology. Another principle which it may be desired to use in a portable device such as a notebook computer is diversity reception, i.e. a principle according to which signals from different antennas are compared, and the strongest signal is used. In addition, the signals received by two or more antennas may be added in order to obtain a stronger total signal.

Due to the growing number of antennas in portable electronic devices such as notebook computers, there is a corresponding need for solutions by means of which the antennas in such a device can be arranged and used in an optimal fashion.

In particular, this need is accentuated by the fact that in a notebook computer, the antennas will usually be arranged in the foldable lid of the computer, so that the antennas may not always be in one and the same position when the device is used. Recently, portable computers have been introduced in which the lid can not only be folded, but can also be rotated and flipped over to act as a drawing board, which further underscores the fact that the lid, and thus the antennas arranged in the lid, can be in a multitude of different positions during use.

Apart from notebook computers, other examples of portable electronic devices in which there are similar needs for better use of antennas arranged in the device are, for example, so called “PDAs”, Personal Digital Assistants, and cellular telephones. These devices may also be equipped with foldable or expandable/retractable lids, in which the antennas are arranged.

SUMMARY

Thus, as explained above, there is a need for a solution by means of which the antennas in a portable electronic device such as, for example, a notebook computer, can be used in a more efficient manner than hitherto.

This need is addressed by the present invention in that it discloses an electronic device which comprises an antenna arrangement in which there is a first and a second antenna group.

Each of the antenna groups comprises at least a first and a second radiation element, and the first and second radiation elements in each group have first and second respective polarizations and gain.

In each of the antenna groups, there is also a beam forming network which is connected to the radiation elements of the group as well as being connected to an output selector.

In the electronic device of the invention, the beam forming network of each of the antenna groups uses the radiation elements in the group to create a radiation pattern of a polarization which is a composite of the first and second polarizations of the elements in the group, so that a first and a second radiation pattern of composite polarization is created, i.e. one radiation pattern of composite polarization from each antenna group.

In addition, the output selector selects or combines, in a predetermined fashion, signals which are received by the two antenna groups as the output of the selector.

Since, in a device of the invention, two radiation patterns of composite polarization can be created, the device of the invention can, for example, be used to create radiation patterns of differing polarizations in order to be able to receive signals which may have been transmitted on a “pure” polarization, but which, due to propagation effects, have had their polarization altered in a manner which cannot be foreseen. However, with the composite polarizations of the radiation patterns of the inventive device, such signals can be received with a better signal strength than would otherwise have been possible, particularly if the two polarizations are different from each other.

In one embodiment of the invention, the beam forming networks of each group combine the radiation patterns of the radiation elements in the group by applying weight factors to the signals transmitted and/or received by one or more of the radiation elements in the group.

In a further embodiment of the invention, the first and second beam forming networks of the respective antenna group applies such weight factors to the signals transmitted and/or received by the first and second radiation elements in their respective group that the first and second composite radiation patterns which are created have first and second differing polarizations. In one such further embodiment, the composite radiation patterns which are created have polarizations which are orthogonal to each other, which may be useful in MIMO applications. However, many combinations of radiation patterns with composite polarization may be created with the device of the invention, not just radiation patterns with polarizations which are orthogonal to each other.

These and other advantages and embodiments of the present invention will become even more evident from the following detailed description.

In addition, the present invention also discloses a method for using an electronic device so as to achieve the advantages of the invention.

BRIEF DESCRIPTION OF THE DRAWINGS

The invention will be described in more detail in the following, with reference to the appended drawings, in which.

DETAILED DESCRIPTION

Figure 1:
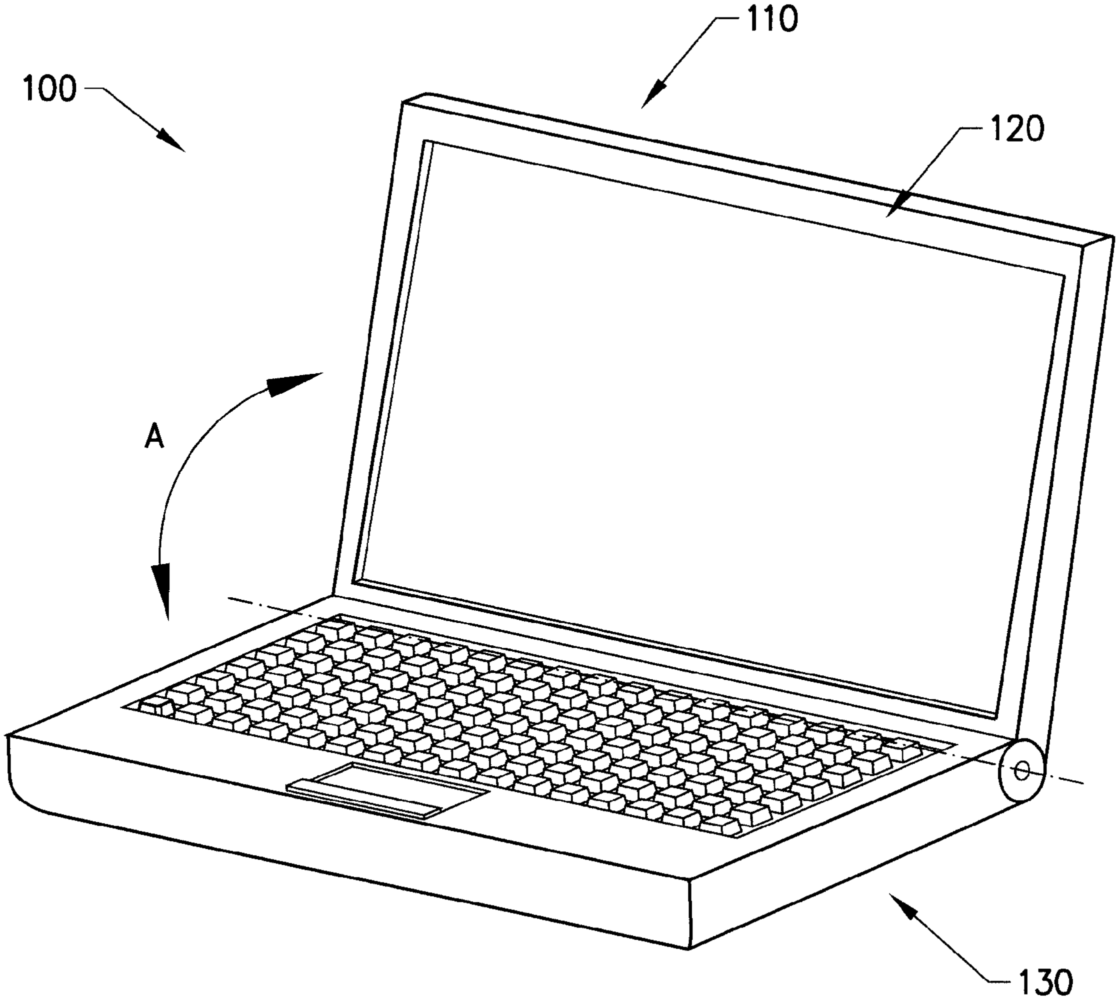
FIG. 1 shows a device in which the invention can be applied.

FIG. 1 shows an example of an electronic device 100 in which the invention can be applied. It should be pointed out that the device 100 shown in FIG. 1 is merely one example of a variety of electronic devices in which the invention can be applied. Other examples of such devices of which mention can be made are personal digital assistants, PDAs, and cellular or cordless telephones.

Returning now to FIG. 1, the device 100 shown there is a portable computer, often referred to as a "notebook" computer. The notebook computer 100 comprises a chassis 130 in which there is a keyboard, and also comprises a lid 110 in which there is a display. The lid 110 and the 130 can be rotated in the direction indicated by means of an arrow in FIG. 1, so that the notebook 100 can be in a closed position, i.e. with the lid 110 in a closed position. Usually, the lid 110 can be rotated 180 degrees, i.e. from 0 degrees which is the closed position, to an open position in which there is an angle of 180 degrees between the chassis 130 and the lid 110.

A device such as the notebook computer 100 of FIG. 1 is usually equipped with means for wireless communication with various networks such as, for example, the Internet and/or home or office networks. In order to perform such communication, the device 100 needs to be equipped with one or more antennas, and with the increasing number of technologies and frequency bands for such communication, most notebook computers and other such devices will be equipped with a number of antennas, in order to be able to handle the various technologies and also to be able to operate on different frequency bands.

An example which can be given of a technology which will necessitate the use of multiple antennas is the so called MIMO technology, Multiple Input Multiple Output technology. Another example of a technology which will lead to the use of multiple antennas in one and the same device is so called diversity reception and/or transmission.

In many cases, the antennas of a portable device such as the device 100 in FIG. 1 will be arranged in the lid 110 of the device, and thus, the position of the antennas may be changed during use, since the lid, as has been mentioned previously, is rotatable with regard to the chassis of the device. Since it will be more or less impossible to know in advance which position the antennas will be in during use of the device, it will be very difficult or impossible to design the antennas in an optimal way in advance. For these and other reasons, there is a growing need for a solution by means of which multiple antennas in a portable electronic device could be utilized and handled in a more rational way than previously.

Figure 2:
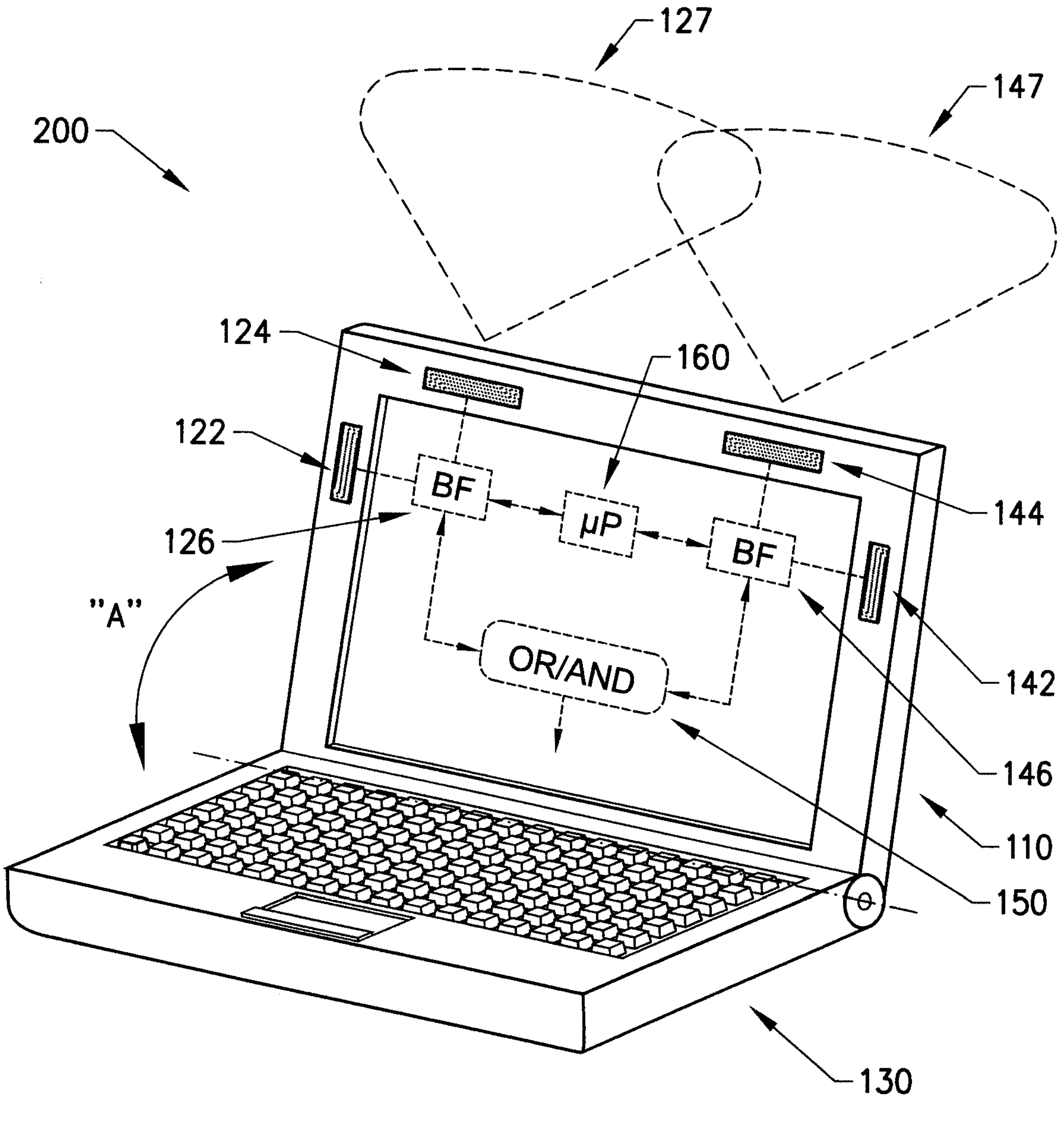
FIG. 2 shows a first embodiment of the invention.

The present invention addresses this need in a way which is exemplified by an embodiment 200 of a portable electronic device shown in FIG. 2.

Components in the device 200 which are similar to those in the device 100 of FIG. 1 have retained their reference numbers from FIG. 1.

Thus, the device 200 of FIG. 2 is a portable computer in which there is arranged a number of antennas 122, 124, 142, 144. As shown in FIG. 2, the antennas of the device 200 are arranged in the lid 110 of the device, which of course is only an example of antenna placement in such a device, other examples will be given later in this text.

As can also be seen in FIG. 2, the antennas, also referred to from now on as "antenna elements", of the device 200 are arranged in two groups with two antenna elements in each group, a first such group thus comprising the antenna elements 122 and 124, and a second group comprising the antenna elements 142 and 144.

It should be pointed out that the use of two antenna elements in each group is merely an example, a larger number of antennas per group is perfectly possible within the scope of the present invention, as is the use of different numbers of antenna elements in each group, so that one group could comprise, for example, three antenna elements and the other group could, for example, comprise four antenna elements. The use of more than two groups in one device is also perfectly feasible.

Each antenna element 122, 124; 142,144 in each group has a respective polarization and antenna gain, which can be the same or different from the other antenna element or elements in the group. As indicated by the alignment of the antenna elements in FIG. 2, the two antenna elements in each of the antenna groups in the device 200 have different polarizations, which are suitably but not necessarily orthogonal to each other.

A number of possible cases regarding the polarization and gain of the antenna elements can be discerned here, which will be described below with reference to each antenna group as having a first and a second antenna element:

1. The first antenna elements 122, 142 of the two antenna groups are essentially identical with respect to their polarization and/or gain.
2. The first antenna elements 122, 142 of the two antenna groups differ from each other with respect to their polarization and/or gain.
3. The second antenna elements 124, 144 of the two antenna groups are essentially identical with respect to their polarization and/or gain.
4. The second antenna elements 124, 144 of the two antenna groups differ from each other with respect to their polarization and/or gain.

Naturally, in a device of the invention, either of case 1 and 2 may be combined with either of case 3 and 4.

As is also shown in FIG. 2, each of the two antenna groups comprises a beam forming network "BF", shown as 126 and 146 in FIG. 2. The beam forming network of each of the antenna groups is connected to both of the antennas in the group, and the two beam forming networks 126, 146 are also connected to an output selector 150.

As symbolically indicated in FIG. 2, each of the antenna groups has a radiation pattern, 127,147. These radiation patterns are created by the beam forming network 126, 146 of each of the antenna groups by using the antenna elements in the group to create a composite radiation pattern for each antenna group, said composite radiation pattern being a composite of the individual radiation patterns of each of the antenna elements of each group.

The use of beam forming networks and their function is as such well known to those skilled in the field, and will accordingly not be explained in depth here. However, in one embodiment of the invention, the beam forming networks 126, 146, of the antenna groups combine the radiation patterns of the radiation elements in the antenna group of the beam forming network by applying different weight factors to the signals transmitted and/or received by the radiation elements in the group. Naturally, a special case of this is if no weights are applied to the signals of one of the radiation elements in the group.

The weights which are applied by the beam forming networks, and thus the composite polarizations which are formed, can be "static", i.e. one and the same set of weights is always applied by the respective beam forming network. However, in one embodiment of the present invention, the forming of composite polarizations is adaptive, so that different composite polarizations can be formed, depending on the situation.

In the latter case, i.e. adaptive forming of the polarizations, the beam forming networks 126, 146 can be controlled by, for example, a microprocessor 160, as shown in FIG. 2. The microprocessor can control the forming of the composite polarizations adaptively according to parameters such as, for example the received signal strength in the antenna groups. The microprocessor 160 can receive information about the signal strength from the beam forming networks, or from a selector 150, which will be described below, so that the signal which is received in each composite radiation pattern is as strong as possible.

More will be said about forming of radiation patters of composite polarization later in this text, but whether the function of the beam forming networks is static or adaptive, a few basic alternatives can be discerned:

The beam forming networks of the respective antenna group create respective composite radiation patterns which have differing polarizations.

The differing polarizations in the case above are orthogonal with respect to each other.

The differing polarizations in the first case above are non-orthogonal with respect to each other.

The beam forming networks of the respective antenna group create respective composite radiation patterns which have the same polarizations. This alternative can be used if it is desired to cover a larger angle than possible with the radiation pattern of one antenna group while maintain one and the same polarization.

As indicated in FIG. 2, the electronic device 100 is equipped with a selector 150, to which the output signals from the beam forming networks 126, 146, are connected. The selector 150 may operate in a number of fashions:

Combining of the signals from the two antenna groups.

Diversity mode: in this case, the selector compares the signals received from the two antenna groups, and chooses as its output the stronger.

If MIMO or some other technology is used in which it is desired to use the two antenna groups as separate units, the selector will merely let the signals from the two antenna groups pass through it as two separate signals.

Figure 3:
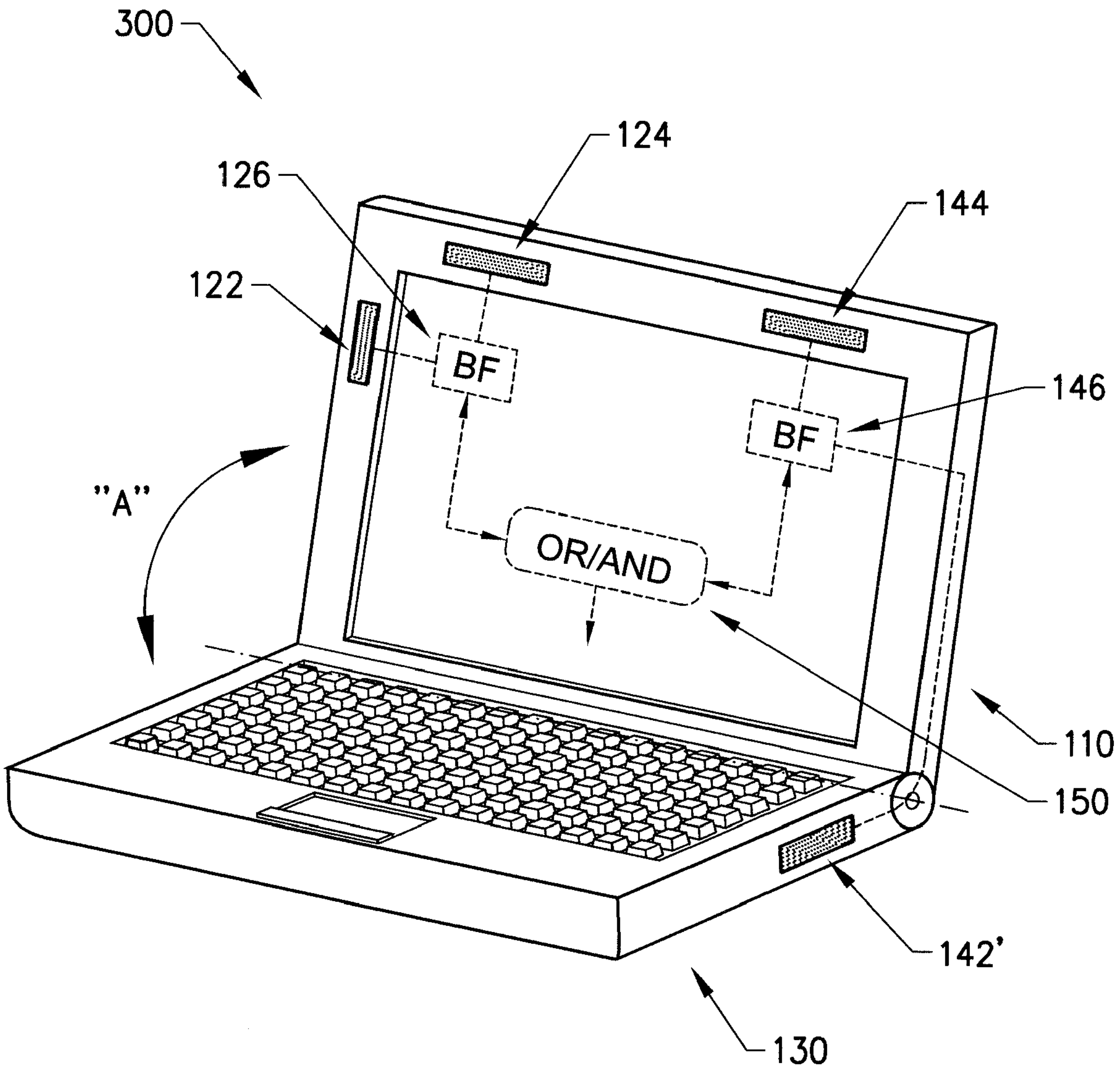
FIG. 3 shows a second embodiment of the invention.

FIG. 3 shows another embodiment 300 of the electronic device of the present invention. The device 300 is similar to the one in FIG. 2, but with one difference: in the embodiment 300, at least one 124' of the elements in one of the antenna groups is arranged in the chassis 130 instead of in the lid 110. In this way, at least one of the antenna groups can be made to comprise a radiation element 144' which has a polarization which is orthogonal to the polarizations obtained with the "lid placement" in the case when the lid is perpendicular to the chassis of the device.

Although not explicitly shown in FIG. 3, the embodiment 300 can also comprise a control means such as the microprocessor 160 shown in FIG. 2, with essentially the same functions as the microprocessor 160 of FIG. 2.

Regarding the embodiments shown in FIGS. 2 and 3, it should be emphasized that although some of the components, such as the beam forming networks, the microprocessor and the selector have been shown as being located in the lid 100 of the device, this is merely an example; some or all of the components in question can be located behind the display, or they can be located in the chassis 130 of the device.

Figure 4:
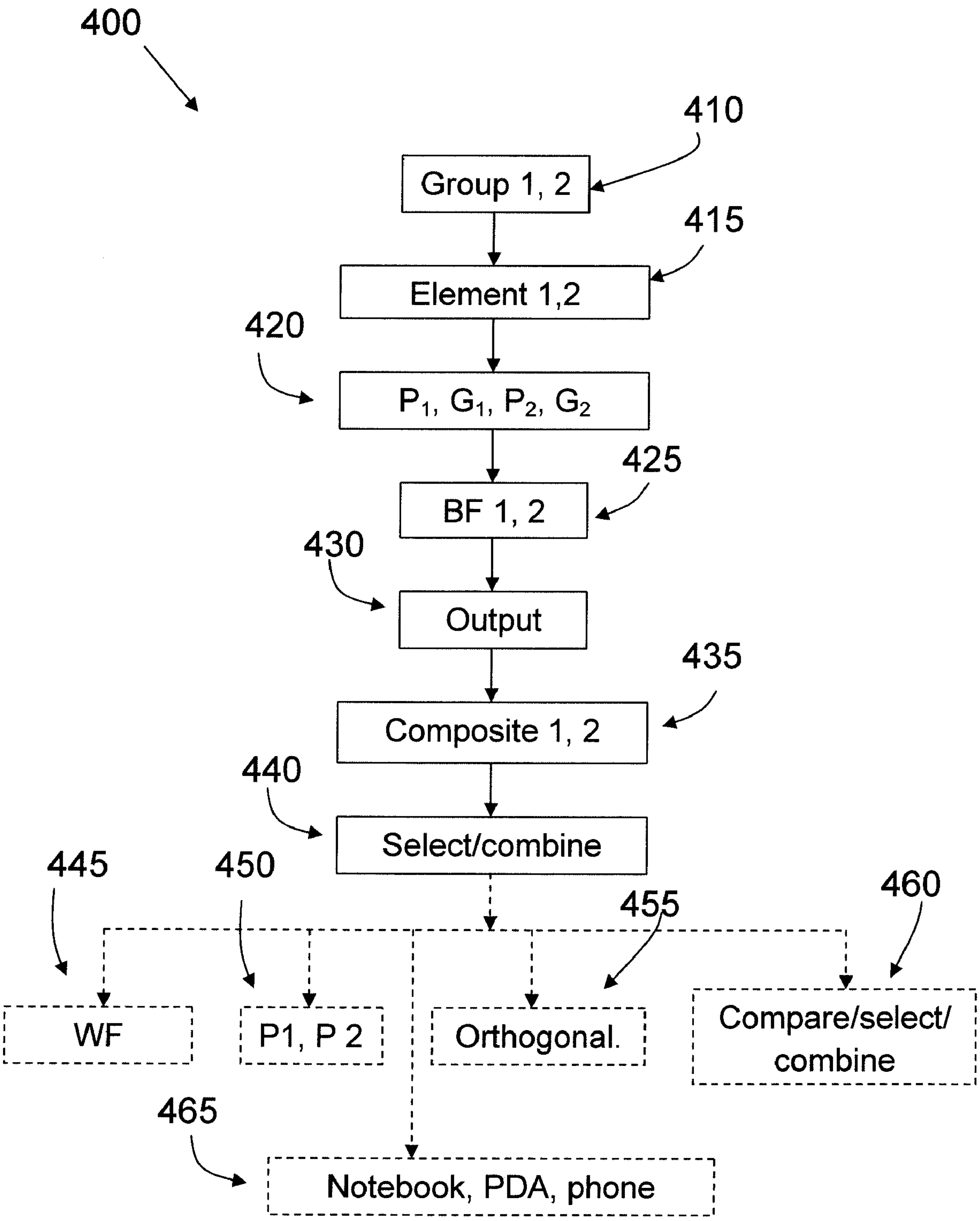
FIG. 4 shows a flow chart of a method of the invention.

FIG. 4 shows a rough flow chart of a method 400 of the invention. Steps which are options or alternatives are shown with dashed lines.

Thus, the method 400 of the invention is intended for the use of an electronic device such as the one 200, 300 shown in FIGS. 2 and 3, and comprises the steps of:

Equipping, step 410, the device with an antenna arrangement in which there is a first and a second antenna group, Arranging, step 415, in each group at least a first and a second radiation element, Letting, step 420, the first and second radiation elements in each group have first and second respective polarizations and gain, Equipping, step 425, each of said groups with a beam forming network which is connected to the radiation elements of the group, Connecting, step 430, the beam forming networks to an output selector.

The inventive method 400 also comprises the steps of:

Letting, step 435, the beam forming network of each antenna group use the radiation elements in the group to create a radiation pattern of a polarization which is a composite of the first and second polarizations of the elements in the group, so that a first and a second radiation pattern of composite polarization is created, and Letting, step 440, the output selector in a predetermined fashion select or combine signals received by the two antenna groups as the output of the selector.

As indicated in step 445, in one embodiment, the beam forming networks may be used to combine the radiation patterns of the radiation elements in the group of the beam forming network by applying weight factors to the signals transmitted and/or received by at least one of the radiation elements in the group.

Step 450 shows that in another embodiment of the invention, the beam forming networks of the respective antenna group can be used to apply such weight factors to the signals transmitted and/or received by the first and second radiation elements in their respective group that the first and second composite radiation patterns which are created have first and second differing polarizations. Alternatively, as shown in step 455, the first and second polarizations can be chosen so that they are orthogonal with respect to each other Step 460 shows that the input selector can be used to compare the signals received by the first and the second antenna group, and to select as its output the stronger of the two signals. Alternatively, as shown in step 460, the input selector can combine the signals received by the first and the second antenna group, and have as its output the combined signal.

In addition, according to the method of the invention, the first radiation elements of both antenna groups can be chosen so that they are essentially identical with respect to their polarization and/or gain, or alternatively, so that they differ from each other with respect to their polarization and/or gain.

Similarly, according to the method of the invention, the second radiation elements of both antenna groups can be chosen so that they are essentially identical with respect to their polarization and/or gain, or so that they differ from each other with respect to their polarization and/or gain.

The method of the invention can be applied to a number of different kinds of electronic devices, such as for example the following:

A portable computer, a "notebook" computer,

A personal digital assistant, a "PDA",

A cellular telephone,

A cordless telephone.

The invention is not limited to the examples of embodiments described above and shown in the drawings, but may be freely varied within the scope of the appended claims.

The invention claimed is:

1. An electronic device comprising:

an antenna arrangement in which there is a first and a second antenna group, with each antenna group comprising at least a first and a second radiation element, the first and second radiation elements in each group having first and second respective polarizations and gain, each of said groups also comprising a beam forming network which is connected to the radiation elements of the group, the beam forming networks also being connected to an output selector, the beam forming network of each antenna group uses the radiation elements in the group to create a radiation pattern of a polarization which is a composite of the first and second polarizations of the elements in the group, so that a first and a second radiation pattern of composite polarization is created, and in that the output selector in a predetermined fashion selects or combines signals received by the two antenna groups as the output of the selector, in which device the beam forming networks combine the radiation patterns of the radiation elements in the group of the beam forming network by applying weight factors to the signals transmitted and/or received by at least one of the radiation elements in the group; wherein the first and second beam forming networks of the respective antenna group applies such weight factors to the signals transmitted and/or received by the first and second radiation elements in their respective group that the first and second composite radiation patterns which are created have first and second differing polarizations.

2. The electronic device of claim 1, wherein the first and second polarizations are orthogonal with respect to each other.

3. The electronic device of claim 1, wherein the input selector compares the signals received by the first and the second antenna group, and selects as its output the stronger of the two signals.

4. The electronic device of claim 1, wherein the input selector combines the signals received by the first and the second antenna group, so that the output from the selector is the combined signal.

5. The electronic device of claim 1, wherein the first radiation elements of both antenna groups are essentially identical with respect to their polarization and/or gain.

6. The electronic device of claim 1, wherein the first radiation elements of the two antenna groups differ from each other with respect to their polarization and/or gain.

7. The electronic device of claim 1, wherein the second radiation elements of both antenna groups are essentially identical with respect to their polarization and/or gain.

8. The electronic device of claim 1, wherein the second radiation elements of the two antenna groups differ from each other with respect to their polarization and/or gain.

9. The electronic device of claim 1, being one of the following:

a portable computer, a “notebook” computer,
a personal digital assistant, a “PDA”,
a cellular telephone,
a cordless telephone.

10. A method for use in an electronic device comprising the steps of:

equipping the device with an antenna arrangement in which there is a first and a second antenna group, arranging in each group at least a first and a second radiation element, letting the first and second radiation elements in each group have first and second respective polarizations and gain, equipping each of said groups with a beam forming network which is connected to the radiation elements of the group, connecting the beam forming networks to an output selector, letting the beam forming network of each antenna group use the radiation elements in the group to create a radiation pattern of a polarization which is a composite of the first and second polarizations of the elements in the group, so that a first and a second radiation pattern of composite polarization is created, and letting the output selector in a predetermined fashion select or combines signals received by the two antenna groups as the output of the selector, letting the beam forming networks combine the radiation patterns of the radiation elements in the group of the beam forming network by applying weight factors to the signals transmitted and/or received by at least one of the radiation elements in the group;

wherein the beam forming networks of the respective antenna group applies such weight factors to the signals transmitted and/or received by the first and second radiation elements in their respective group that the first and second composite radiation patterns which are created have first and second differing polarizations.

11. The method of claim 10, wherein the first and second polarizations are chosen so that they are orthogonal with respect to each other.

12. The method of claim 10, wherein the input selector is used to compare the signals received by the first and the second antenna group, and selects as its output the stronger of the two signals.

13. The method of claim 10, wherein which the input selector combines the signals received by the first and the second antenna group, so that the output from the selector is the combined signal.

14. The method of claim 10, wherein the first radiation elements of both antenna groups are chosen so that they are essentially identical with respect to their polarization and/or gain.

15. The method of claim 10, wherein the first radiation elements of the two antenna groups are chosen so that they differ from each other with respect to their polarization and/or gain.

16. The method of claim 10, wherein the second radiation elements of both antenna groups are chosen so that they are essentially identical with respect to their polarization and/or gain.

17. The method of claim 10, wherein the second radiation elements of the two antenna groups are chosen so that they differ from each other with respect to their polarization and/or gain.

18. The method of claim 10, applied to an electronic device which is one of the following:

a portable computer, a “notebook” computer,
a personal digital assistant, a “PDA”,
a cellular telephone,
a cordless telephone.

* * * * *

UNITED STATES PATENT AND TRADEMARK OFFICE

CERTIFICATE OF CORRECTION

PATENT NO. : 8,224,271 B2
APPLICATION NO. : 12/810059
DATED : July 17, 2012
INVENTOR(S) : Persson et al.

It is certified that error appears in the above-identified patent and that said Letters Patent is hereby corrected as shown below:

In Figure 4, Sheet 4 of 4, delete “Fig” and insert -- Fig. --, therefor.

In Column 5, Line 54, delete “100” and insert -- 110 --, therefor.

In Column 6, Line 33, delete “other” and insert -- other. --, therefor.

Signed and Sealed this
Twenty-seventh Day of November, 2012

David J. Kappos

David J. Kappos
*Director of the United States Patent and Trademark Office*